(12) United States Patent
Li et al.

(10) Patent No.: US 10,886,724 B2
(45) Date of Patent: Jan. 5, 2021

(54) LEAKAGE CURRENT DETECTION AND INTERRUPTION DEVICE FOR POWER CORD

(71) Applicant: Chengli Li, Suzhou (CN)

(72) Inventors: Chengli Li, Suzhou (CN); Yongsen Li, Suzhou (CN); Shengyun Nie, Suzhou (CN)

(73) Assignee: Chengli Li, Suzhou (CN)

( * ) Notice: Subject to any disclaimer, the term of this patent is extended or adjusted under 35 U.S.C. 154(b) by 110 days.

(21) Appl. No.: 16/412,795

(22) Filed: May 15, 2019

(65) Prior Publication Data

US 2020/0366083 A1 Nov. 19, 2020

(30) Foreign Application Priority Data

May 5, 2019 (CN) .......................... 2019 1 0367054
May 5, 2019 (CN) ...................... 2019 2 0625789 U

(51) Int. Cl.
| | | |
|---|---|---|
| H02H 3/16 | (2006.01) | |
| H01B 7/22 | (2006.01) | |
| H02H 3/05 | (2006.01) | |
| H02H 1/00 | (2006.01) | |
| H01B 7/02 | (2006.01) | |

(52) U.S. Cl.
CPC ............. *H02H 3/16* (2013.01); *H01B 7/0225* (2013.01); *H01B 7/22* (2013.01); *H02H 1/0007* (2013.01); *H02H 3/05* (2013.01)

(58) Field of Classification Search
CPC .......... H02H 1/0007; H02H 3/05; H02H 3/16; H01B 7/0225; H01B 7/22
USPC .......................................................... 361/42
See application file for complete search history.

(56) References Cited

U.S. PATENT DOCUMENTS

| | | | | |
|---|---|---|---|---|
| 2006/0137894 A1* | 6/2006 | Cusson | ..................... | H01B 7/20 174/105 R |
| 2007/0159740 A1* | 7/2007 | Williams | ................ | H01H 83/02 361/42 |
| 2015/0349517 A1* | 12/2015 | Li | ............................ | H02H 3/16 361/42 |

* cited by examiner

*Primary Examiner* — Kevin J Comber
(74) *Attorney, Agent, or Firm* — Chen Yoshimura LLP

(57) ABSTRACT

A leakage current detection and interruption (LCDI) device for a power cord includes a switch unit configured to control an electrical connection between an input end and an output end, and a leakage current protection unit, which includes a switch drive module and a leakage current detection module. The leakage current detection module includes first and second leakage current detection lines coupled in series. The switch drive module is configured to control the switch unit based on a leakage current signal generated by the leakage current detection module to disconnect the electrical connection. The LCDI device can detect whether the first and second leakage current detection lines are intact, thereby ensuring the reliability of the device.

11 Claims, 5 Drawing Sheets

LEAKAGE CURRENT DETECTION AND INTERRUPTION DEVICE FOR POWER CORD

BACKGROUND OF THE INVENTION

Field of the Invention

This invention relates to electrical apparatus, and in particular, it relates to a leakage current detection and interruption device for power cord.

Description of Related Art

A leakage current detection and interruption (LCDI) device for a power cord is a safety device that can prevent fire caused by electrical apparatus. It is implemented in a power cord that has a plug, and functions to detect leakage currents that may occur between the hot line, the neutral line, and the shield layer of the power cord that extend between the plug and the load (e.g. electrical appliances such as air conditioner, dehumidifier, etc.). Upon detecting a leakage current, the device cuts off the power supply, thereby preventing fire and ensuring safety. The device can prevent fire caused by arc fault which can result from damage of the insulation in the hot, neutral, and ground lines of the power cord due to aging, wear, pinch, animal chewing, etc.

In a conventional LCDI device shown in FIGS. 1 and 1A, the test circuitry (with the external TEST button) can be used to test whether the internal circuitry and trip mechanism of the plug function normally. However, the test circuitry cannot determine whether the leakage current detection line (i.e. the shield layer) in the cord between the plug head and the load end is functioning normally to detect the leakage current. If the leakage current detection line has an open circuit, even when the user presses the TEST button and the reset (RESET) button and they indicate normal functioning, the LCDI device in fact does not have a protection function due to the open circuit in the leakage current detection line. This is a hidden safety threat and can cause fire or other danger.

Therefore, there is a need for an LCDI device that can detect whether the leakage current detection line is functioning properly.

SUMMARY

To solve the above problem, the present invention provides a power cord with an leakage current detection and interruption device, which includes: a switch unit, configured to control an electrical connection between an input end and an output end; and a leakage current protection unit, which includes a switch drive module and a leakage current detection module, wherein the leakage current detection module includes a first leakage current detection line and a second leakage current detection line coupled in series; wherein the switch drive module is configured to control the switch unit based on a leakage current signal generated by the leakage current detection module to disconnect the electrical connection.

In one embodiment, the power cord with leakage current detection and interruption device further includes a testing unit, the testing unit including a test switch coupled to the leakage current protection unit, wherein at least the test switch and the leakage current protection unit form a test circuit, wherein when the test switch is closed and the leakage current detection module is in a first state, the switch drive module drives the switch unit to disconnect the electrical connection.

In one embodiment, when the test switch is closed and the leakage current detection module is in a second state, the switch unit maintains the electrical connection.

In one embodiment, the power cord with leakage current detection and interruption device further includes an insulating structure which surrounds at least one of the first leakage current detection line and the second leakage current detection line.

In one embodiment, the insulating structure is formed of a rubber or plastic material as one piece or is formed of insulating paper and/or fabric cover.

In one embodiment, each of the first leakage current detection line and the second leakage current detection line surrounds at least one of the power supply lines of the cord.

In one embodiment, the first leakage current detection line surrounds a first one of the power supply lines and the second leakage current detection line surrounds a second one of the power supply lines.

In one embodiment, the first leakage current detection line surrounds a first one and a second one of the power supply lines, the insulating structure surrounds the first leakage current detection line and a ground line, and the second leakage current detection line surrounds the insulating structure.

In one embodiment, the first leakage current detection line surrounds a first one, a second one and a third one of the power supply lines, the insulating structure surrounds the first leakage current detection line and a ground line, and the second leakage current detection line surrounds the insulating structure.

In one embodiment, each of the first leakage current detection line and the second leakage current detection line is a woven structure made of metal, or a wound structure formed of one or more metal wires, or a combination of a woven structure made of metal and a wound structure formed of one or more metal wires.

In one embodiment, each of the first leakage current detection line and the second leakage current detection line is a metal foil cover or a combination of a woven structure made of metal and a metal foil cover.

In one embodiment, each of the first leakage current detection line and/or the second leakage current detection line is formed of a material that is electrically conductive on one side and electrically insulating on an opposite side, wherein the electrically insulating side is an exterior side.

Embodiments of the present invention can detect whether the first and second leakage current detection lines are intact, thereby ensuring the reliability of the LCDI device.

BRIEF DESCRIPTION OF THE DRAWINGS

The embodiments are described with reference to the drawings. These drawings are used to explain the structure and operating principle of the embodiment, and only illustrate aspects of the embodiments. These drawings are not to scale. In the drawings, like symbols indicate like structures.

DETAILED DESCRIPTION OF PREFERRED EMBODIMENTS

Embodiments of the present invention are described below with reference to the drawings. These drawings and descriptions explain embodiments the invention but do not limit the invention. Other embodiments are possible without departing from the spirit and scope of the invention. Various modification and variations can be made in both the structure and the working principle of the device. Thus, it is intended that the scope of the invention is defined by the appended claims.

In the descriptions below, terms such as "including" are intended to be open-ended and mean "including without limitation", and can include other contents. "Based on" means "at least partly based on." "An embodiment" means "at least one embodiment." "Another embodiment" means "at least another embodiment," etc.

Embodiments of the present invention provide a leakage current detection and interruption (LCDI) device in which the test (TEST) button can be operated to test whether the leakage current detection line (i.e. the shield layer) in the cord has an open circuit (e.g. is broken).

Figure 1:
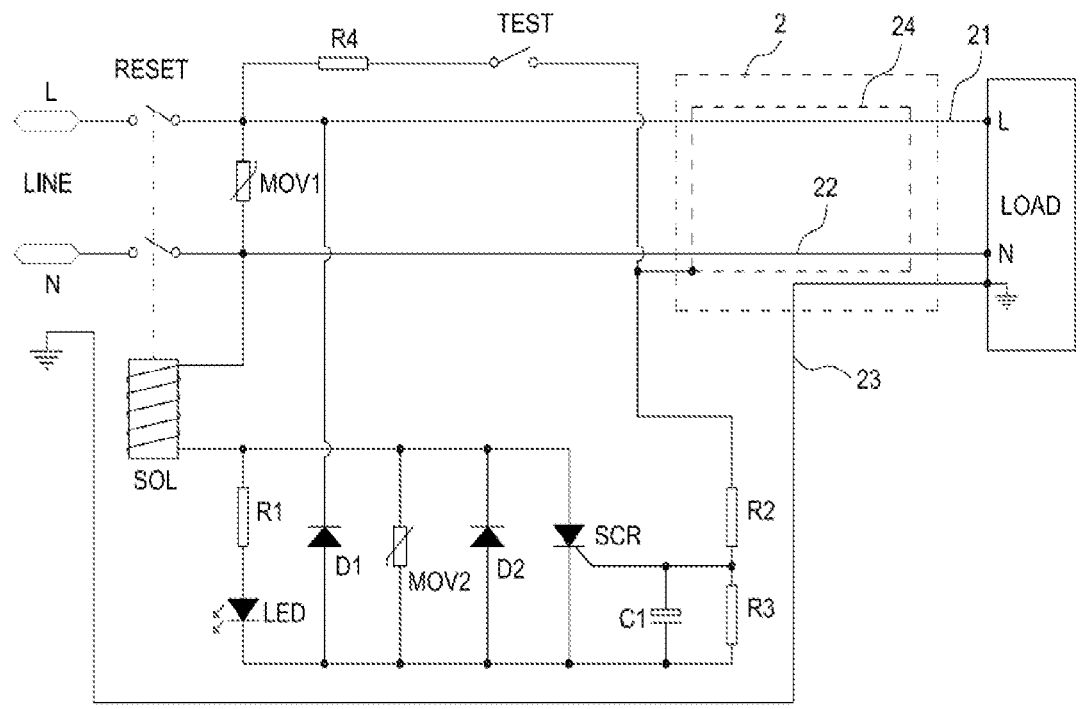
FIG. 1 is a circuit diagram of a conventional LCDI device.
Figure 1A:
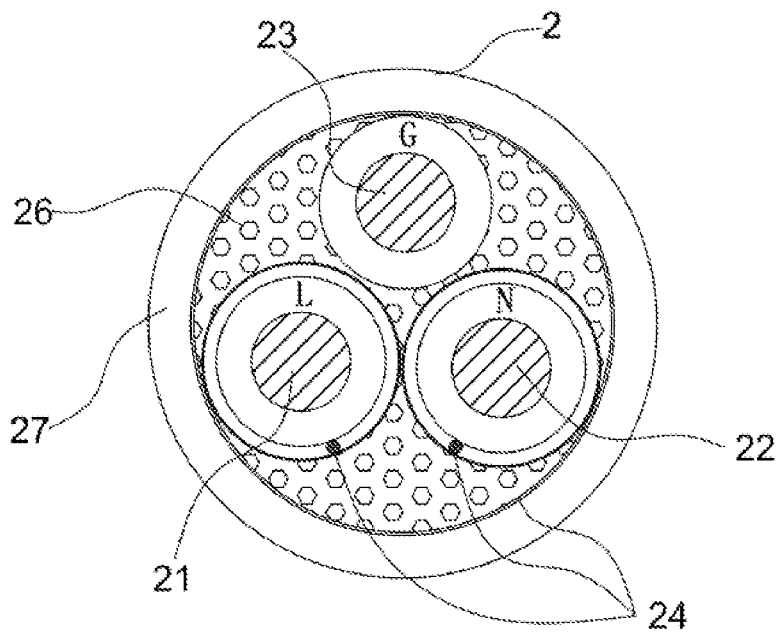
FIG. 1A shows the cross-section of the cord in the LCDI device of FIG. 1.
Figure 2:
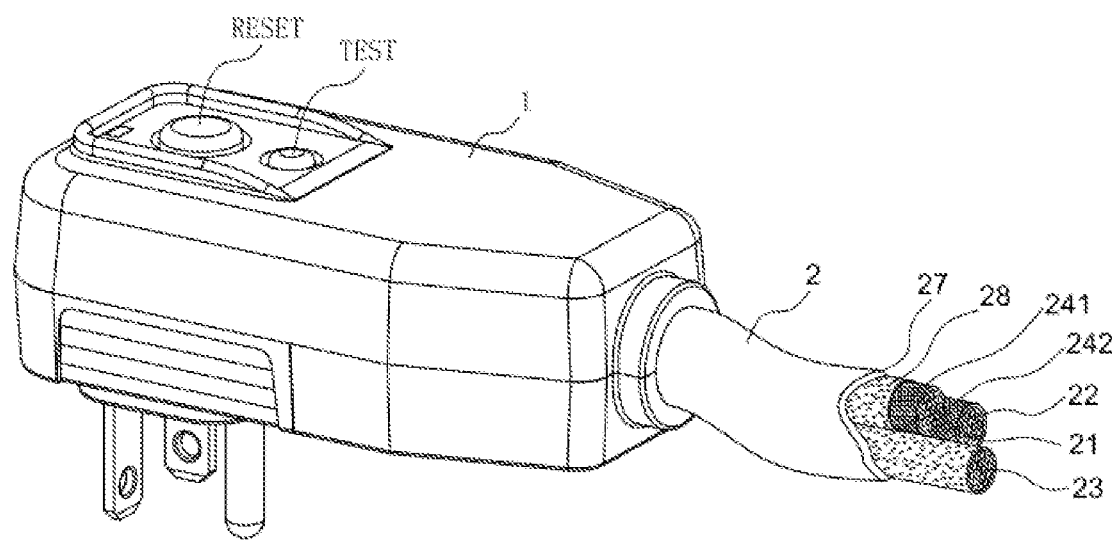
FIG. 2 illustrates an exterior view of an LCDI power plug device according to an embodiment of the present invention.
Figure 3A:
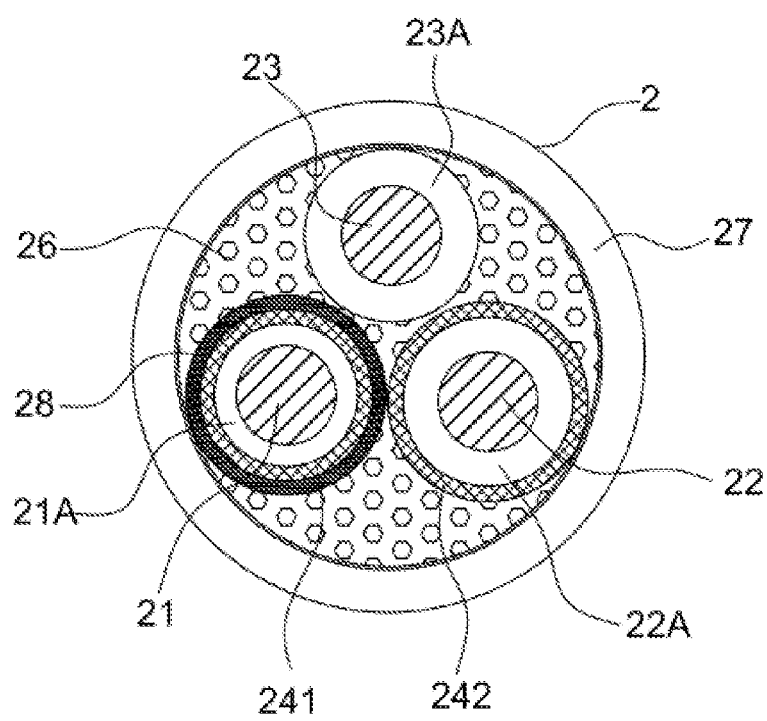
FIG. 3A shows the cross-section of the cord of an LCDI device according to a first embodiment of the present invention.
Figure 3B:
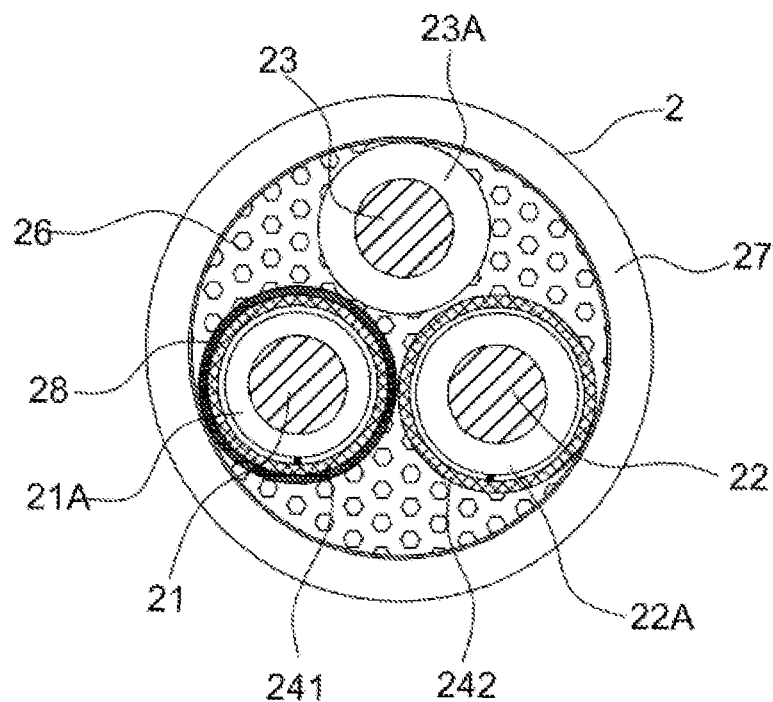
FIG. 3B shows the cross-section of the cord of an LCDI device according to a second embodiment of the present invention.
Figure 3C:
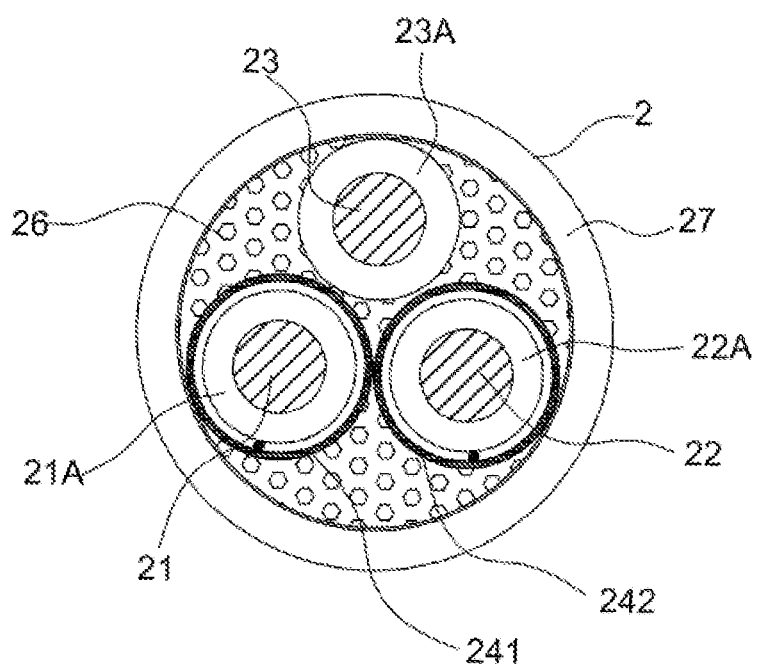
FIG. 3C shows the cross-section of the cord of an LCDI device according to a third embodiment of the present invention.
Figure 3D:
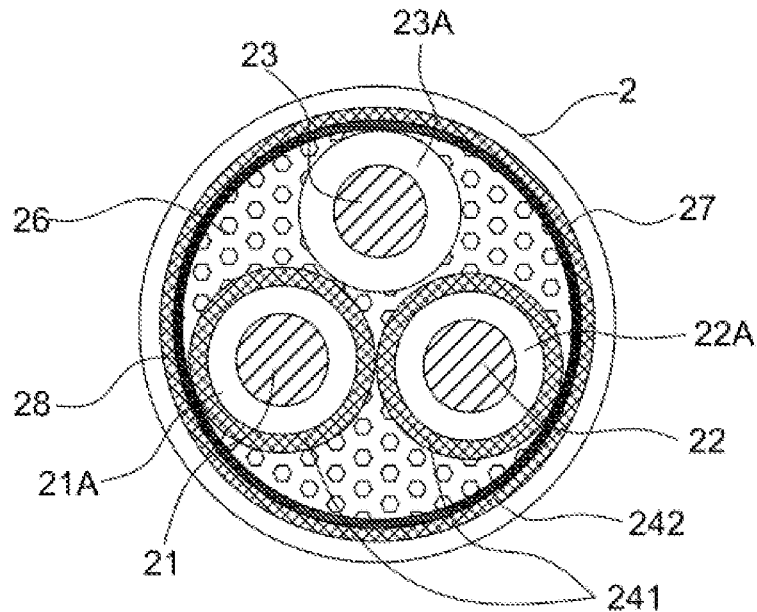
FIG. 3D shows the cross-section of the cord of an LCDI device according to a fourth embodiment of the present invention.

As shown in FIG. 2, the LCDI device according to an embodiment of the present invention includes a plug head 1 that includes a switch unit, and an external cord 2. The plug head 1 has a test switch (TEST) and a reset switch (RESET). In the embodiment shown in FIG. 2, the cord 2 includes a hot line (L) 21, neutral line (N) 22, ground line (G) 23, leakage current detection lines (shield lines) 241 and 242, and an electrically insulating outer cover 27. The cross-sectional outer shape of the cord 2 may be round. The hot line 21, neutral line 22, and ground line 23 are respectively covered by electrically insulating layers 21A, 22A and 23A (as shown in FIGS. 3A-3D). In the first to third embodiments shown in FIGS. 3A-3C, the leakage current detection lines 241 and 242 respectively cover the insulating layers 21A and 22A. The cord 2 may alternatively have a flat cross-sectional outer shape with the lines arranged side-by-side, or be made to have other cross-sectional outer shapes. In other embodiments, the cord 2 may additionally include other signal lines. As shown in FIGS. 3A-3D, the cord 2 further includes a filling material 26. The leakage current detection line 241 may be covered by an electrically insulating structure 28 and the leakage current detection line 242 may have no insulating structure covering it (see FIGS. 3A and 3B). Alternatively, the leakage current detection line 242 may be covered by an insulating structure and the leakage current detection line 241 may have no insulating structure covering it (not shown in the drawings). The leakage current detection lines 241 and 242 may be woven structures made of metal (e.g., copper, aluminum, etc.) (see FIGS. 3A and 3D), or wound structures formed of one or more metal wires (not shown in the drawings), or metal foil covers (see FIGS. 3B and 3C), or combinations of the above. The insulating structure 28 may be a rubber or plastic material formed in one piece, or it may be formed of insulating paper or fabric or other insulating materials surrounding the wires. The leakage current detection lines 241 and 242 may be a one-sided insulating material (i.e., a sheet material that is electrically conductive on one side and electrically insulating on the opposite side) forming a cover, which can eliminate the need for a separate insulating structure 28 (see FIG. 3C). The leakage current detection line 241 encloses at least one power supply wire (e.g., the hot line (L) 21, the neutral line (N) 22, etc.). In the fourth embodiment shown in FIG. 3D, the leakage current detection line 241 simultaneously surrounds the hot line 21 and the neutral line 22, the insulating structure 28 surrounds the leakage current detection line 241 and the ground line 23, and the leakage current detection line 242 surrounds the insulating structure 28. It should be understood that the leakage current detection line 241 or the leakage current detection line 242 may simultaneously surround multiple power supply wires (current carrying wires).

Figure 4:
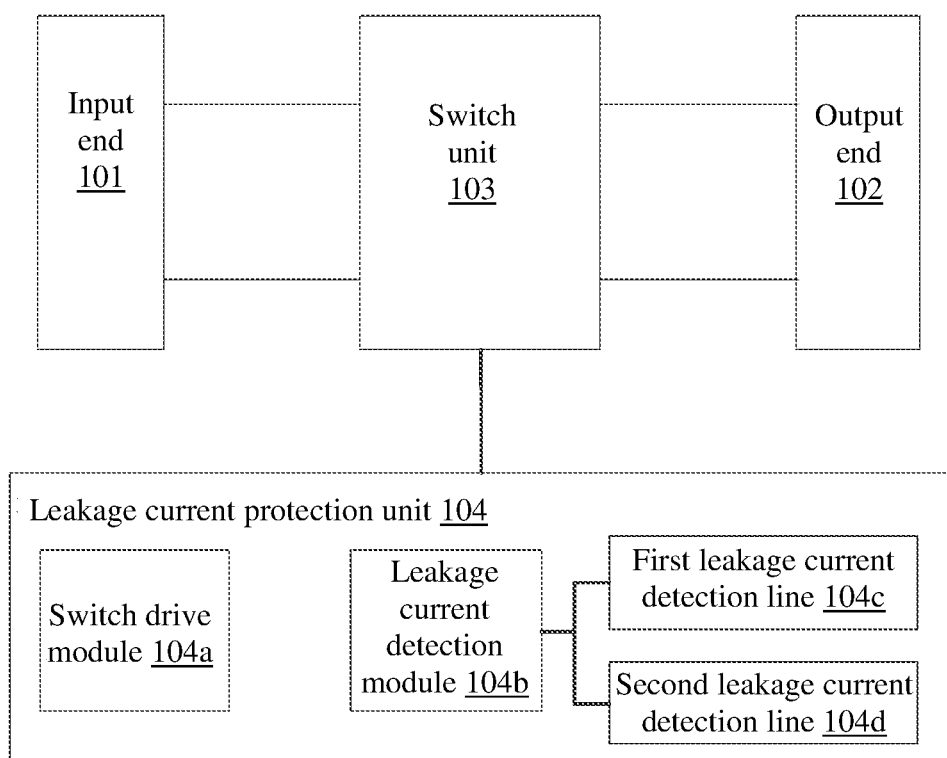
FIG. 4 is a block diagram of an LCDI device according to an embodiment of the present invention.

FIG. 4 is a block diagram of an LCDI device according to an embodiment of the present invention. The LCDI device 10 includes: a switch unit 103 having a mechanical switch, configured to control the electrical connection between the input end 101 and the output end 102; and a leakage current protection unit 104, which includes a switch drive module 104a and a leakage current detection module 104b. The leakage current detection module 104b includes a first leakage current detection line 104c (e.g. line 241) and a second leakage current detection line 104d (e.g. line 242), which are coupled in series. The switch drive module 104a is configured to control the switch unit 103 based on the leakage current signal generated by the leakage current detection module 104b, to cut off the electrical connection.

Figure 5:
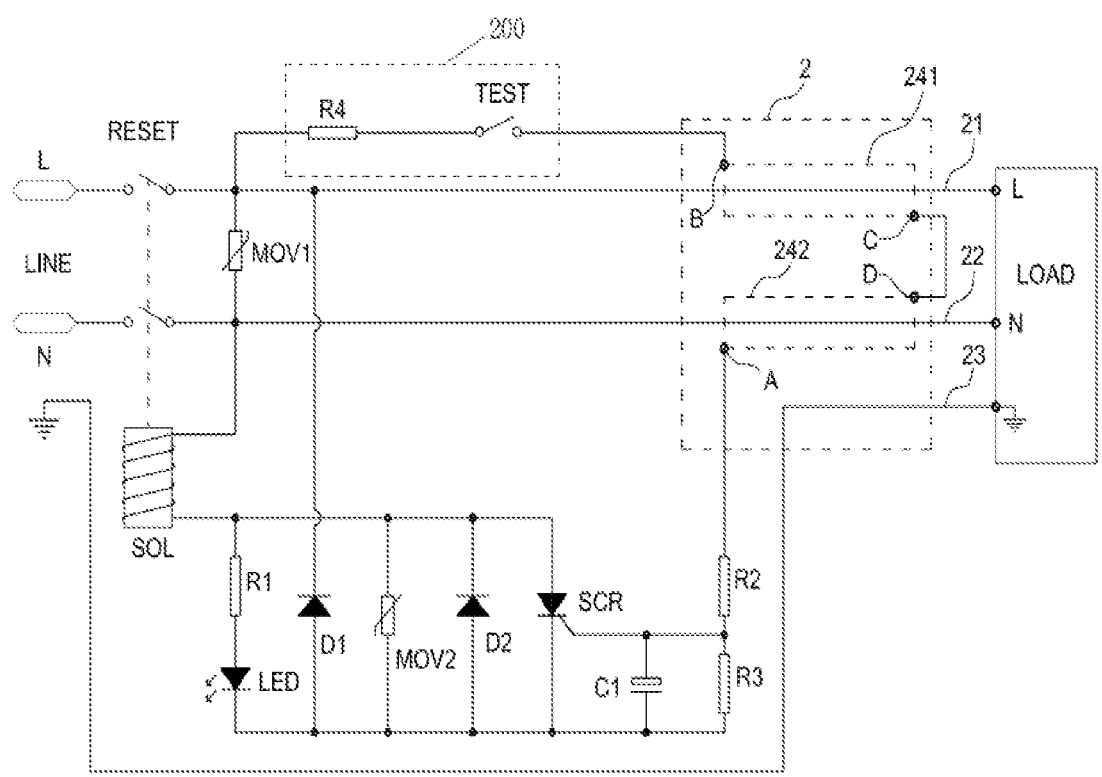
FIG. 5 is a circuit diagram of an LCDI device according to an embodiment of the present invention.

FIG. 5 is a circuit diagram of an LCDI device according to an embodiment of the present invention. As shown in FIG. 5, the LCDI device further includes a testing unit 200, which includes resistor R4 (a simulated leakage current generating component) and a test switch TEST. One end A of the leakage current detection line 242 of the cord 2 is coupled to a control circuit (resistor) R2, and the other end D of the leakage current detection line 242 is coupled to one end C of the leakage current detection line 241; the other end B of the leakage current detection line 241 is coupled to the test switch TEST. Thus, the test switch TEST is coupled to the leakage current detection lines 241 and 242. Further, the end B of the leakage current detection line 241 is coupled to the hot line L. The neutral line N is coupled to the end A of the leakage current detection line 242 via the solenoid SOL, silicon controlled rectifier SCR and resistor R2. The control electrode of the silicon controlled rectifier SCR is coupled to one end of the capacitor C1; the cathode of the silicon controlled rectifier SCR is coupled to the other end of the capacitor C1; and capacitor C1 is coupled in parallel with resistor R3. In this embodiment, the hot line L is coupled to the neutral line N via resistor R4, test switch TEST, leakage current detection line 241, leakage current detection line 242, resistor R2, resistor R3, diode D2, and solenoid SOL, to form a test circuit M.

During normal operation, the test switch TEST is open. When the leakage current detection lines 241 and 242 function normally (i.e. no open circuit condition exists), or when there is no leakage current between power supply lines 21, 22 and 23 and the leakage current detection lines 241 and 242, the silicon controlled rectifier SCR is not triggered, and the LCDI device functions normally. When the test switch TEST is closed, i.e., the test circuit M is a closed circuit, a simulated leakage current flows through the test circuit M (in this state, the testing unit (R2, test switch) and the leakage current detection lines 241 and 242 form a current path, and the leakage current detection module is in a state where it detects the simulated leakage current). The simulated leakage current causes the voltage across resistor R3 to rise, so as to trigger the silicon controlled rectifier SCR to become conductive. When the silicon controlled rectifier SCR is conductive, the neutral line N, solenoid SOL, silicon controlled rectifier SCR, diode D1, and hot line L form a trip circuit. Therefore, a relatively large current flows through the solenoid SOL, which generates a sufficiently large magnetic field to trip the reset switch RESET, thereby cutting off the power supply. If any part or component of the leakage current detection lines 241 and 242 is an open circuit, then when the test switch TEST is closed, the test circuit M cannot form a closed current path, so no simulated leakage current flows through the test circuit M (in this state, the testing unit (R2, test switch) and the leakage current detection lines 241 and 242 do not form a current path, and the leakage current detection module is in the state where it does not detect a simulated leakage current), so the LCDI device will not be tripped. This is a warning to the user that at least one of the leakage current detection lines 241 and 242 has a possible open circuit condition. This way, the user may operate the test switch TEST to determine whether the leakage current detection lines 241 and 242 are functioning properly. It should be understood that, depending on different applications, the circuit can be used to determine whether other components of the test circuit are malfunctioning.

Embodiments of the present invention can accomplish testing of the proper function of the leakage current detection lines by the user manually operating the test switch TEST, thereby enhancing the safety of the device.

While embodiments of the invention have been described, the specific embodiments are only exemplary, and do not limit the scope of the invention. Those skilled in the art may make changes, additions or omissions to the embodiments without departing from the spirit and scope of the invention.

What is claimed is:

1. A power cord with an leakage current detection and interruption device, comprising:
    a first power supply line and a second power supply line;
    a switch unit, configured to control an electrical connection of the first and second power supply lines between an input end and an output end; and
    a leakage current protection unit, which includes a switch drive module and a leakage current detection module, wherein the leakage current detection module includes a first leakage current detection line and a second leakage current detection line coupled in series to form a current path from a first point of the first leakage current detection line to a second point of the first leakage current detection line, then to a second point of the second leakage current detection line, and then to a first point of the second leakage current detection line, wherein the first point of the first leakage current detection line is coupled to the first power supply line, and wherein the first point and second point of the first leakage current detection line are spaced apart along the first leakage current detection line and the first point and second point of the second leakage current detection line are spaced apart along the second leakage current detection line;
    wherein the first points of the first and second leakage current detection lines are closer to the input end than the second points of the first and second leakage current detection lines and the second points of the first and second leakage current detection lines are closer to the output end than the first points of the first and second leakage current detection lines;
    wherein the switch drive module is configured to control the switch unit based on a leakage current signal generated by the leakage current detection module to disconnect the electrical connection.

2. The power cord with leakage current detection and interruption device of claim 1, further comprising a testing unit, the testing unit including a test switch coupled to the leakage current protection unit, wherein at least the test switch and the leakage current protection unit form a test circuit, wherein when the test switch is closed and the leakage current detection module is in a first state, the switch drive module drives the switch unit to disconnect the electrical connection.

3. The power cord with leakage current detection and interruption device of claim 2, wherein when the test switch is closed and the leakage current detection module is in a second state, the switch unit maintains the electrical connection.

4. The power cord with leakage current detection and interruption device of claim 1, further comprising an insulating structure which surrounds at least one of the first leakage current detection line and the second leakage current detection line.

5. The power cord with leakage current detection and interruption device of claim 4, wherein the insulating structure is formed of a rubber or plastic material as one piece or is formed of insulating paper and/or fabric cover.

6. The power cord with leakage current detection and interruption device of claim 4, wherein each of the first leakage current detection line and the second leakage current detection line surrounds at least one of the first and second power supply lines.

7. The power cord with leakage current detection and interruption device of claim 6, wherein the first leakage current detection line surrounds the first power supply line and the second leakage current detection line surrounds the second power supply line.

8. The power cord with leakage current detection and interruption device of claim 6, wherein the first leakage current detection line surrounds the first and the second power supply lines, wherein the insulating structure surrounds the first leakage current detection line and a ground line, and wherein the second leakage current detection line surrounds the insulating structure.

9. The power cord with leakage current detection and interruption device of claim 1, wherein each of the first leakage current detection line and the second leakage current detection line is a woven structure made of metal, or a wound structure formed of one or more metal wires, or a combination of a woven structure made of metal and a wound structure formed of one or more metal wires.

10. The power cord with leakage current detection and interruption device of claim 1, wherein each of the first leakage current detection line and the second leakage current detection line is a metal foil cover or a combination of a woven structure made of metal and a metal foil cover.

11. The power cord with leakage current detection and interruption device of claim 1, wherein each of the first leakage current detection line and/or the second leakage current detection line is formed of a material that is electrically conductive on one side and electrically insulating on an opposite side, wherein the electrically insulating side is an exterior side.

* * * * *